US012730670B2

(12) United States Patent
Eker et al.

(10) Patent No.: US 12,730,670 B2
(45) Date of Patent: Sep. 8, 2026

(54) QUEUE MANAGEMENT FOR TASK GRAPHS

(71) Applicant: Advanced Micro Devices, Inc., Santa Clara, CA (US)

(72) Inventors: Ali Arda Eker, Bellevue, WA (US); Martha Massee Barker, New York, NY (US); Anthony Thomas Gutierrez, Seattle, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 426 days.

(21) Appl. No.: 18/240,692

(22) Filed: Aug. 31, 2023

(65) Prior Publication Data

US 2025/0077307 A1 Mar. 6, 2025

(51) Int. Cl.
*G06F 9/48* (2006.01)
*G06F 9/50* (2006.01)
*G06F 9/52* (2006.01)

(52) U.S. Cl.
CPC .............. *G06F 9/4881* (2013.01); *G06F 9/48* (2013.01); *G06F 9/4806* (2013.01); *G06F 9/4843* (2013.01); *G06F 9/485* (2013.01); *G06F 9/50* (2013.01); *G06F 9/5005* (2013.01); *G06F 9/5027* (2013.01); *G06F 9/5038* (2013.01); *G06F 9/5044* (2013.01); *G06F 9/5083* (2013.01); *G06F 9/5088* (2013.01); *G06F 9/52* (2013.01); *G06F 9/522* (2013.01)

(58) Field of Classification Search
CPC ........ G06F 9/48; G06F 9/4806; G06F 9/4843; G06F 9/485; G06F 9/4881; G06F 9/50; G06F 9/5005; G06F 9/5027; G06F 9/5038; G06F 9/5044; G06F 9/5083; G06F 9/5088; G06F 9/52; G06F 9/522
See application file for complete search history.

(56) References Cited

U.S. PATENT DOCUMENTS 10,754,706 B1 * 8/2020 Mo ....................... G06F 9/5038
2009/0265528 A1 * 10/2009 Du ...................... G06F 9/30014 712/E9.016
2011/0125986 A1 * 5/2011 Reid ....................... G06F 9/547 712/E9.035
2015/0066157 A1 * 3/2015 Karypis ................ G06F 9/4843 700/3

(Continued)

*Primary Examiner* — Charles M Swift
(74) *Attorney, Agent, or Firm* — FIG. 1 Patents

(57) ABSTRACT

In accordance with the described techniques, a command processor processes a fiber graph that includes fibers each having one or more tasks and indicates dependencies between the fibers and between tasks within the fibers. As part of this, the command processor dispatches a task from a fiber for execution by a processing element array based on the fiber being enqueued in a ready queue and the dependencies of the task being resolved. While the task is dispatched and unexecuted by the processing element array, the command processor enqueues the fiber in a sleep queue. Further, the command processor enqueues the fiber in a check queue based on the one or more tasks of the fiber having been executed by the processing element array. Based on the fiber being in the check queue, the command processor enqueues a dependent fiber in the ready queue that depends from the fiber.

20 Claims, 5 Drawing Sheets

(56) References Cited

U.S. PATENT DOCUMENTS

| | | | | |
|---|---|---|---|---|
| 2015/0347187 | A1* | 12/2015 | Panda | G06F 9/5027<br>718/102 |
| 2017/0109214 | A1* | 4/2017 | Raman | G06F 9/4881 |
| 2017/0315846 | A1* | 11/2017 | Wang | G06F 15/177 |
| 2018/0203724 | A1* | 7/2018 | Driever | G06F 9/4843 |
| 2023/0123634 | A1* | 4/2023 | Steinberger | G06F 9/3838<br>382/110 |

* cited by examiner

Operations 128

Dispatch, T1, F1

Push F1 to Back of Ready Queue

Enqueue Completion Signal (T1) in Signal Queue

Decrement Barrier Counters

Dispatch T2, F1

Push F1 to Back of Ready Queue

Enqueue Completion Signal (T2) in Signal Queue

Decrement Barrier Counters

Enqueue F1 in Check Queue

Fetch Dependent Fibers (F2, F3)

Enqueue F2 and F3 in Ready Queue

Dispatch Task, F2

Dispatch Task, F3

Completion Signal, T1, F1

Completion Signal, T2, F1

First Thread

Second Thread

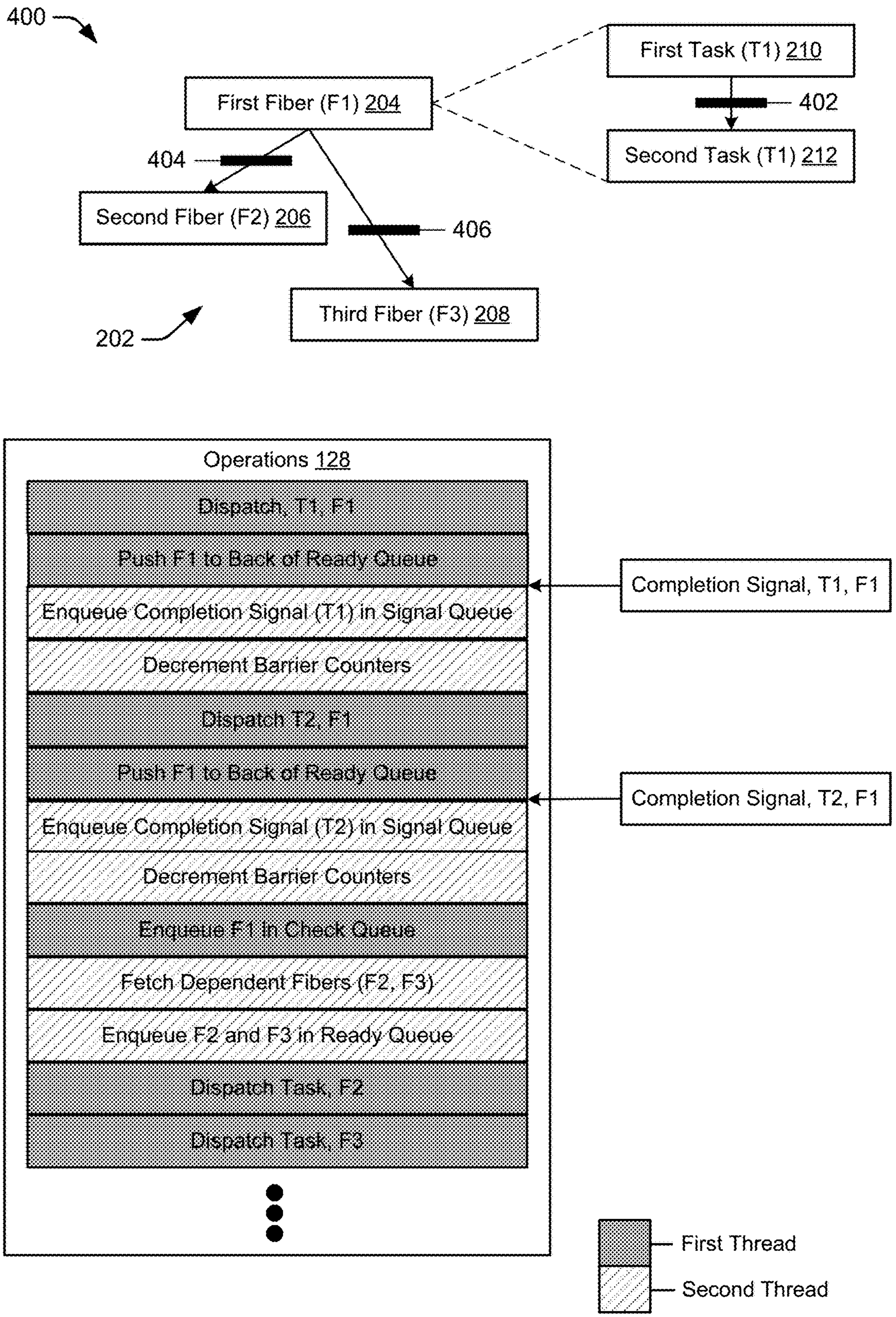

FIG. 4

QUEUE MANAGEMENT FOR TASK GRAPHS

BACKGROUND

In various computing systems, computer programs are represented as task graphs, which typically include nodes that are processing kernels (e.g., tasks), and edges indicating dependencies between the tasks. In one or more computing systems, task graphs are offloaded (e.g., by a host) to an accelerator device that includes an array of processing elements, each capable of processing individual tasks of the task graph in parallel. Accelerator devices are thus favorable candidates for executing task graphs due to the potential for parallelism with respect to task processing.

BRIEF DESCRIPTION OF THE DRAWINGS

FIG. 4 depicts a non-limiting example in which a scheduler of a command processor manages a ready queue, a signal queue, and a check queue.

DETAILED DESCRIPTION

Overview

Figure 1:
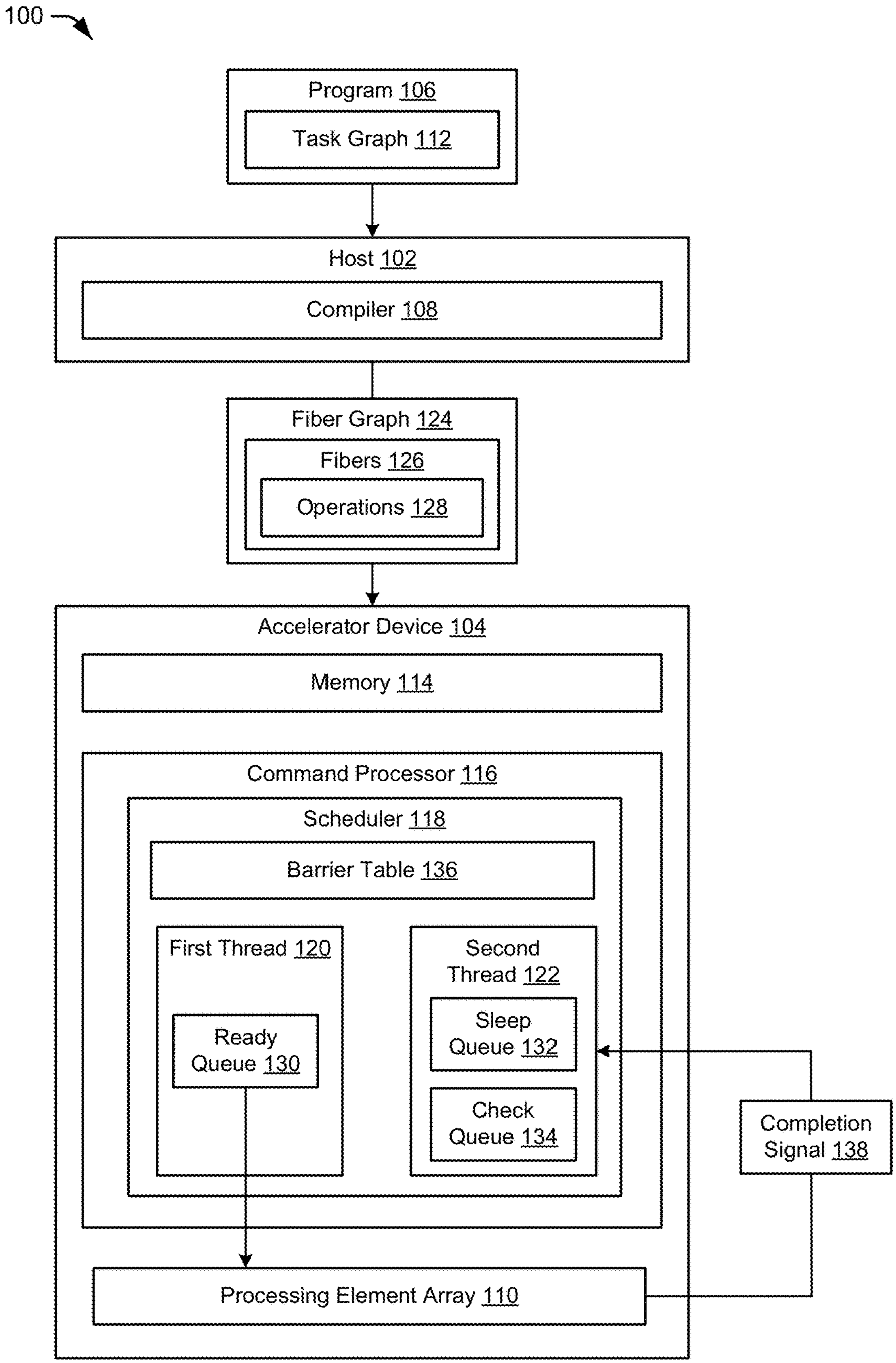
FIG. 1 is a block diagram of a non-limiting example system to implement queue management for task graphs.

An accelerator device includes a memory, a processing element array, and a command processor having a scheduler. The memory stores a fiber graph that includes a plurality of fibers each having one or more tasks. The fiber graph indicates task level dependencies between individual tasks within the fibers and fiber level dependencies between the plurality of fibers. Generally, the scheduler is configured to schedule tasks of the fiber graph in a way that preserves the dependencies, while maximizing in-parallel execution of individual tasks by different processing elements of the processing element array.

One challenge associated with executing task graphs on the accelerator device, however, is that task graphs typically have a low compute-to-memory ratio. By way of example, each node in a task graph exposes just a few compute cycles, but there is a multitude of nodes, and a multitude of dependencies to track. Therefore, task scheduling and synchronization overhead often dominate the command processor's workload, which hinders the parallelism enabled by the accelerator device. Head-of-queue blocking is frequent in conventional task scheduling techniques, which further increases task synchronization overhead, and in turn, further hinders the parallelism enabled by the accelerator device.

In accordance with the described techniques, the scheduler manages three first-in-first-out (FIFO) queues—a ready queue, a sleep queue, and a check queue. Broadly, the scheduler enqueues fibers in the ready queue, the sleep queue, or the check queue based on statuses or states of tasks within the fiber. As part of this, the scheduler enqueues fibers in the ready queue that include at least one task that is ready for dispatch. A task is considered ready for dispatch if the task has no unresolved dependencies. Further, the scheduler enqueues fibers in the sleep queue which include at least one sleeping task (e.g., a task that is dispatched but unexecuted by the processing element array), and which do not include a task that is ready for dispatch. Moreover, the scheduler enqueues complete fibers in the check queue. A fiber is considered complete if all tasks in the fiber have been executed by the processing element array.

In addition, the scheduler performs functions with respect to the fibers in the fiber graph based on whether the fibers are enqueued in the ready queue, the sleep queue, or the check queue. For instance, the scheduler dispatches a task from a fiber based on the fiber being enqueued in the ready queue and the task being ready for dispatch. In addition, the scheduler monitors for completion signals of sleeping tasks in a fiber based on the fiber being enqueued in the sleep queue. Furthermore, the scheduler, based on a fiber being enqueued in the check queue, fetches and enqueues a dependent fiber in the ready queue that depends on the fiber.

In one or more implementations, the ready queue is managed by a first thread of execution running on the command processor, while the sleep queue and the check queue are managed by a second thread of execution running on the command processor. The first thread is configured to remove fibers from the ready queue, and enqueue fibers in the sleep queue and the check queue. The second thread is configured to remove fibers from the sleep queue and the check queue, and enqueue fibers in the ready queue. By managing the queues in this manner, the ready queue, the sleep queue, and the check queue are single-producer, single-consumer queues. As such, the queues are implemented lock-free, thereby benefitting from improved computer performance by avoiding overhead associated with acquiring, holding, and releasing locks. Furthermore, by implementing multi-threading, the described techniques improve resource utilization on the core(s) of the command processor.

Moreover, the described techniques dispatch ready tasks with reduced delay after dependencies are resolved by utilizing the ready queue, the sleep queue, and the check queue. For instance, the described techniques alleviate head-of-queue blocking by enqueueing sleeping fibers in the sleep queue. This enables the scheduler to dispatch tasks from independent fibers in the ready queue without waiting for dispatched tasks in the ready queue to be executed. Further, the described techniques enable faster detection of task completion than conventional techniques since solely sleeping fibers in the sleep queue are evaluated for task completion. Accordingly, the described techniques decrease task scheduling and synchronization overhead, and improve in-parallel execution of tasks in the fiber graph.

In some aspects, the techniques described herein relate to an accelerator device, comprising a processing element array, a memory configured to store a fiber graph that includes fibers each having one or more tasks and indicates dependencies between the fibers and between the tasks within the fibers, and a command processor configured to perform operations including dispatching a task from a fiber for execution by the processing element array based on the fiber being enqueued in a ready queue and the dependencies of the task being resolved, enqueueing the fiber in a sleep queue while the task is dispatched and unexecuted by the processing element array, enqueueing the fiber in a check queue based on the one or more tasks of the fiber having been executed by the processing element array, and enqueuing a dependent fiber that depends from the fiber in the ready queue based on the fiber being enqueued in the check queue.

In some aspects, the techniques described herein relate to an accelerator device, the operations further including dispatching an additional task from the dependent fiber based on the dependent fiber being enqueued in the ready queue and the dependencies of the additional task being resolved.

In some aspects, the techniques described herein relate to an accelerator device, wherein an additional fiber is enqueued ahead of the fiber in the ready queue and the dependencies of an additional task in the additional fiber are resolved, the task being dispatched before the additional task based on the fiber being assigned a higher priority than the additional fiber.

In some aspects, the techniques described herein relate to an accelerator device, wherein enqueuing the fiber in the check queue includes moving the fiber from the sleep queue to the ready queue responsive to receiving a completion signal indicating that the task has been executed by the processing element array, dispatching an additional task from the fiber based on the fiber being in the ready queue and the dependencies of the additional task being resolved, and moving the fiber from the ready queue to the sleep queue while the additional task is dispatched and unexecuted by the processing element array.

In some aspects, the techniques described herein relate to an accelerator device, wherein enqueueing the fiber in the check queue includes moving the fiber from the sleep queue to the ready queue responsive to receiving an additional completion signal indicating that the additional task has been executed by the processing element array, and moving the fiber from the ready queue to the check queue based on the one or more tasks of the fiber having been executed by the processing element array.

In some aspects, the techniques described herein relate to an accelerator device, wherein an additional fiber is enqueued ahead of the fiber in the sleep queue, and moving the fiber to the ready queue includes waiting for a dispatched task of the additional fiber to be executed before processing the completion signal of the task.

In some aspects, the techniques described herein relate to an accelerator device, wherein an additional fiber is enqueued ahead of the fiber in the sleep queue, and moving the fiber to the ready queue includes processing the completion signal of the task before a dispatched task of the additional fiber has been executed.

In some aspects, the techniques described herein relate to an accelerator device, wherein enqueuing the dependent fiber in the ready queue includes retrieving the dependent fiber from the memory based on the dependent fiber being identified using the fiber graph, and enqueueing the dependent fiber in the ready queue based on the dependent fiber having a resolved dependency on the one or more tasks of the fiber.

In some aspects, the techniques described herein relate to an accelerator device, wherein the ready queue, the sleep queue, and the check queue are single-producer, single-consumer queues based on a first thread of the command processor managing the ready queue, and a second thread of the command processor managing the sleep queue and the check queue.

In some aspects, the techniques described herein relate to an accelerator device, wherein dispatching the task includes selecting, in accordance with a load balancing policy, a processing element of the processing element array to which the task is to be dispatched, the load balancing policy indicating to balance workloads dispatched to each processing element of the processing element array.

In some aspects, the techniques described herein relate to an accelerator device, wherein dispatching the task includes selecting, in accordance with a locality policy, a processing element of the processing element array to which the task is to be dispatched, the locality policy indicating to dispatch the one or more tasks of each respective fiber to a same respective processing element of the processing element array.

In some aspects, the techniques described herein relate to an accelerator device, wherein enqueuing the fiber in the sleep queue includes placing the fiber in a sleep pool while the task is dispatched and unexecuted by the processing element array, and enqueuing, by the processing element array and responsive to the task being executed, a wakeup command in the sleep queue that identifies the fiber.

In some aspects, the techniques described herein relate to an accelerator device, wherein enqueuing the fiber in the check queue includes looking up the fiber in the sleep pool based on the wakeup command being enqueued in the sleep queue, and retrieving the fiber from the sleep pool.

In some aspects, the techniques described herein relate to an accelerator device, wherein the ready queue, the sleep queue, and the check queue are first-in-first-out queues.

In some aspects, the techniques described herein relate to a method, comprising receiving, by a command processor, a fiber including one or more tasks and indicating dependencies between the one or more tasks, dispatching, by the command processor, a task from the fiber for execution by a processing element array based on the fiber being enqueued in a ready queue and the dependencies of the task being resolved, enqueueing, by the command processor, the fiber in a sleep queue while the task is dispatched and unexecuted by the processing element array, enqueueing, by the command processor, the fiber in the ready queue based on receiving a completion signal indicating that the task has been executed by the processing element array, and enqueueing, by the command processor, a dependent fiber that depends from the fiber in the ready queue based on the fiber being enqueued in the ready queue and the one or more tasks of the fiber having been executed by the processing element array.

In some aspects, the techniques described herein relate to a method, wherein the fiber includes a set of operations instructing the command processor to process the fiber, and the dependent fiber is enqueued in the ready queue based on a wake fiber operation in the set of operations that identifies the dependent fiber.

In some aspects, the techniques described herein relate to a method, wherein the wake fiber operation is placed within the set of operations after an operation to enqueue the task in the ready queue based on a final task of the fiber having been executed by the processing element array.

In some aspects, the techniques described herein relate to a system, comprising an accelerator device that includes a command processor and a processing element array, and a host configured to compile operations for executing a fiber graph that includes fibers each having one or more tasks and indicates dependencies between the fibers and between the tasks within the fibers, the operations instructing the command processor to dispatch a task from a fiber for execution by the processing element array based on the fiber being enqueued in a ready queue and the dependencies of the task being resolved, push the fiber to a tail of the ready queue based on the task being dispatched and unexecuted by the processing element array, enqueue the fiber in a check queue based on the fiber being enqueued in the ready queue and the one or more tasks of the fiber having been executed by the processing element array, and enqueue a dependent fiber that depends from the fiber in the ready queue based on the fiber being in the check queue.

In some aspects, the techniques described herein relate to a system, wherein the fiber includes a barrier representing the dependencies of the dependent fiber, and the command processor maintains a barrier table that includes a value representing a number of unresolved dependencies associated with the barrier.

In some aspects, the techniques described herein relate to a system, wherein to enqueue the fiber in the check queue, the operations instruct the command processor to receive a completion signal indicating that the task has been executed by the processing element array, enqueue the completion signal in a signal queue, decrement the value associated with the barrier in the barrier table based on the completion signal being in the signal queue, and enqueue the fiber in the check queue based on the value associated with the barrier being decremented to zero.

FIG. 1 is a block diagram of a non-limiting example system 100 to implement techniques for queue management for task graphs. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

In accordance with the described techniques, the system includes a host 102 and an accelerator device 104, which are coupled to one another via a wired or wireless connection. Example wired connections include, but are not limited to, buses (e.g., a data bus), interconnects, traces, and planes. The host 102 is an electronic circuit that reads, translates, and executes tasks of a program 106. Examples of the host 102 include, but are not limited to, a central processing unit (CPU), a field-programmable gate array (FGPA), and an application-specific integrated circuit (ASIC). As shown, the host 102 includes a compiler 108, which represents computer software that runs on the host 102 to translate (e.g., compile) the program 106 from a high-level source programming language into machine code, byte code, or some other low-level programming language that is executable by hardware components of the system 100.

The accelerator device 104 is an electronic circuit that is designed to execute a particular type of task of the program 106 with increased efficiency, as compared to the host 102. Examples of the accelerator device 104 include, but are not limited to, a graphics processing unit (GPU), a digital signal processor (DSP), a vision processing unit (VPU), and a cryptographic accelerator. Broadly, the host 102 offloads tasks to the accelerator device 104 to be executed by a processing element array 110, which includes a plurality of processing elements that are each capable of processing individual tasks of the program 106 in parallel.

In accordance with the described techniques, the host 102 receives the program 106 as a task graph 112, which includes nodes that are processing kernels (e.g., tasks), and edges that indicate dependencies between individual processing kernels of the task graph 112. In general, the system 100 is configured to schedule tasks of the task graph 112 in a way that preserves the dependencies, while maximizing in-parallel execution of the tasks by the processing element array 110.

One challenge associated with executing task graphs on the accelerator device 104, however, is that task graphs typically have a low compute-to-memory ratio. By way of example, each node in a fine-grained task graph 112 exposes just a few compute cycles, but there is a multitude of nodes, and a multitude of dependencies to track. While finer task granularity for the task graph 112 enables increased parallelism (e.g., based on there being more tasks that are executable concurrently), finer task granularity also increases task scheduling and synchronization overhead, e.g., based on there being more dependencies to track and preserve. Due to the inherent task scheduling and synchronization overhead associated with fine-grained task graphs, it is important that tasks be dispatched as quickly as possible when their dependencies are resolved. However, head-of-queue blocking is frequent in conventional task scheduling techniques, which further exacerbates task synchronization overhead. As a result, conventional techniques hinder the parallel processibility enabled by the accelerator device 104.

To dispatch ready tasks with reduced delay after dependencies are resolved, techniques are described herein for queue management for task graphs. As shown, the accelerator device 104 includes a memory 114 and a command processor 116. The memory 114 is a device or system that is used to store information, such as for immediate use in the accelerator device 104, e.g., by the processing element array 110 and/or the command processor 116. In at least one example, the command processor 116 is a central processing unit (CPU) embedded in a same computer chip that houses the accelerator device 104.

Moreover, the command processor 116 includes a scheduler 118, which is configured to schedule ready tasks (e.g., tasks having no unresolved dependencies) for execution by the processing element array 110. In one or more examples, the scheduler 118 is implemented as firmware running on the command processor 116, and implements two threads of execution—a first thread 120 and a second thread 122. Broadly, a thread of execution is a sequence of programmed instructions that is manageable independently by the scheduler 118. As illustrated by the multiple threads 120, 122 of execution, the command processor 116 implements multithreading, meaning the first thread 120 and the second thread 122 are executed concurrently while sharing resources of one or more cores of the command processor 116. Multithreading leads to increased resource utilization on the one or more cores of the command processor 116 by way of thread-level parallelism.

In one or more implementations, the host 102 receives the task graph 112, and the compiler 108 transforms the task graph 112 into a fiber graph 124. As shown, the fiber graph 124 includes a plurality of fibers 126. Moreover, each respective fiber 126 includes one or more tasks, as well as dependencies between the individual tasks of the respective fiber 126, e.g., task level dependencies. In addition, the fiber graph 124 includes dependencies between the fibers 126, e.g., fiber level dependencies. By grouping the tasks of the task graph 112 into the fibers 126, the compiler 108 coarsens the task graph 112. This reduces task scheduling overhead as the scheduler 118 has fewer schedulable entities to schedule (e.g., the scheduler 118 schedules the fibers 126 containing groups of tasks, rather than individual tasks), and there are fewer dependencies for the scheduler 118 to track, e.g., multiple task level dependencies are representable by a single fiber level dependency.

It should be noted that, in one or more implementations, the host 102 does not group multiple tasks into the fibers 126, and instead, each of the fibers 126 include just one task. In other words, the fiber graph 124 is the task graph 112, in variations. Thus, while the operations are described herein in the context of fibers 126 containing groupings of multiple tasks, these operations are equally applicable to fibers 126 containing just one task, e.g., the task graph 112.

In addition to grouping the tasks of the task graph 112 into the fibers 126, the compiler 108 additionally defines operations 128 for each of the fibers 126. In one example, the operations 128 are generated by the compiler 108. Additionally or alternatively, the operations 128 are generated by a programmer and translated, by the compiler 108, from a high-level source programming language to a low-level hardware-executable programming language. Once generated, the host 102 communicates the fiber graph 124 including the fibers 126 and corresponding operations 128 to the accelerator device 104 to be stored in the memory 114. To execute the operations 128 of a fiber 126, the command processor 116 retrieves the operations 128 of the fiber 126 from the memory 114, and processes the operations 128.

Broadly, the operations 128 instruct the scheduler 118 to enqueue a respective fiber 126 of the fiber graph 124 in a ready queue 130, a sleep queue 132, or a check queue 134 based on a status of the respective fiber 126. In addition, the operations 128 instruct the scheduler 118 to perform functions with respect to a fiber 126 based on a queue 130, 132, 134 in which the fiber 126 is enqueued. In one or more examples, the ready queue 130, the sleep queue 132, and the check queue 134 are first-in-first-out (FIFO) queues. As shown, the first thread 120 manages the ready queue 130, while the second thread 122 manages the sleep queue 132 and the check queue 134. It should be noted that the queues 130, 132, 134 include pointers (e.g., addresses) which point to fibers 126 that are stored in the memory 114, rather than the fibers 126 themselves. Accordingly, while operations are described herein as "enqueuing," "moving," or "placing" the fibers 126 in the queues 130, 132, 134, it is to be appreciated that it is, in fact, pointers to the fibers 126 that are present in the queues 130, 132, 134.

In one or more implementations, the scheduler 118 utilizes a barrier table 136 to track the dependencies of the fiber graph 124. The barrier table 136 tracks fiber level dependencies between the fibers 126, as well as task level dependencies between individual tasks within a fiber 126. By way of example, each respective child fiber 126 includes a barrier in the barrier table 136 having a value corresponding to a number of parent fibers 126 that the child fiber 126 depends from. Broadly, when a parent fiber 126 completes (e.g., all tasks within the parent fiber 126 are executed), the barriers associated with the child fibers 126 that depend on the parent fiber 126 are decremented by a value of one. Additionally, each respective child task in a fiber 126 includes a barrier in the barrier table 136 having a value corresponding to a number of parent tasks within the fiber 126 that the child task depends from. In general, when a parent task within the fiber 126 has been executed, the barriers associated with the child tasks that depend on the parent task are decremented by a value of one.

Given the above, the barrier table 136 is employable by the first thread 120 and/or the second thread 122 to determine that the dependencies of a child fiber 126 and/or a child task have been resolved based on the child fiber 126 and/or the child task having a barrier with a value of zero. In contrast, the barrier table 136 is employable by the first thread 120 and/or the second thread 122 to determine that child fiber 126 and/or a child task has unresolved dependencies based on the child fiber 126 and/or the child task having a barrier with a non-zero value.

In accordance with the described techniques, the operations 128 instruct the scheduler 118 to enqueue fibers 126 in the ready queue 130 based on the fibers 126 having a "ready" status. Notably, a fiber 126 is ready if it includes at least one ready task, and a task is considered ready for dispatch if the task has no unresolved dependencies. Further, a task has an unresolved dependency when the task depends on at least one other task in the fiber graph 124 that has not yet been executed by the processing element array 110. It follows that a task has a resolved dependency when the task depends on one or more tasks in the fiber graph 124, and the one or more tasks have been executed by the processing element array 110. Therefore, the operations 128 instruct the scheduler 118 to enqueue the fiber 126 in the ready queue 130 if the fiber 126 includes at least one task that does not depend on execution of other tasks of the fiber graph 124 (e.g., the at least one task is independent), or if the dependencies of at least one task in the fiber 126 are resolved.

The operations 128 further instruct the scheduler 118 to enqueue fibers 126 in the sleep queue 132 based on the fibers 126 having a "sleeping" status. Notably, a fiber 126 is "sleeping" if there are no ready tasks in the fiber 126, and the fiber 126 includes at least one sleeping task. Further, a task is considered to be "sleeping" if the task has been dispatched for execution by the processing element array 110, but has not yet been executed by the processing element array 110.

Moreover, the operations 128 instruct the scheduler 118 to enqueue fibers 126 in the check queue 134 based on the fibers 126 having a "complete" status. A fiber 126 is complete if all tasks within the fiber 126 are complete, and a task is considered to be complete once it has been executed by the processing element array 110. Once a task has been executed, the processing element array 110 communicates a completion signal 138 to the scheduler 118. Broadly, the completion signal 138 identifies the task and indicates to the scheduler 118 that the task has been executed. Accordingly, the scheduler 118 enqueues a fiber 126 in the check queue 134 responsive to the scheduler 118 having received completion signals 138 for each task within the fiber 126.

The operations 128 additionally instruct the scheduler 118 to perform functions with respect to a fiber 126 based on whether the fiber 126 is enqueued in the ready queue 130, the sleep queue 132, or the check queue 134. Indeed, the scheduler 118 is configured to dispatch a task from a fiber 126 based on the fiber 126 being enqueued in the ready queue 130. Upon encountering the fiber 126 at the head of the ready queue 130, for example, the scheduler 118 looks up the fiber 126 in the memory 114 using the pointer to the fiber 126 present in the ready queue 130. Based on the lookup, the scheduler 118 determines that the fiber 126 includes at least one ready task, and in response, the scheduler 118 dispatches the ready task.

Additionally, the scheduler 118 is configured to monitor for completion signals 138 of sleeping tasks within a fiber 126 based on the fiber 126 being enqueued in the sleep queue 132. Upon receiving the completion signals 138 for the sleeping tasks of the fiber 126, the scheduler 118 moves the fiber 126 to either the ready queue 130 or the check queue 134. Indeed, the scheduler 118 moves the fiber 126 from the sleep queue 132 to the ready queue 130 if, after the sleeping tasks are executed, at least one unexecuted task remains in the fiber 126. Alternatively, the scheduler 118 moves the fiber 126 from the sleep queue 132 to the check queue 134 if, after the sleeping tasks are executed, execution of each task in the fiber 126 is complete.

Based on a parent fiber 126 being in the check queue 134, the scheduler 118 is configured to enqueue one or more child fibers 126 that depend on the parent fiber 126 in the ready queue 130. Notably, the enqueued child fibers 126 are fibers 126 having their dependencies resolved by way of the parent fiber 126 having completed. Upon encountering a fiber 126 in the check queue 134, for example, the scheduler 118 looks up the fiber 126 in the memory 114 using the pointer to the fiber 126 that is present in the check queue 134. Further, the fiber 126 stored in the memory 114 includes pointers to dependent fibers 126 that depend on at least one task in the fiber 126. Using the pointers, the scheduler 118 decrements the barriers associated with the child fibers 126 in the barrier table 136. If the barrier of a child fiber 126 is decremented to a value of zero, then the scheduler 118 enqueues the child fiber 126 (e.g., using the pointer) in the ready queue 130.

The described techniques dispatch ready tasks with reduced delay after dependencies are resolved by utilizing the ready queue 130, the sleep queue 132, and the check queue 134 in the described manner. For instance, the described techniques alleviate head-of-queue blocking encountered by conventional techniques by enqueueing sleeping fibers 126 in the sleep queue 132. This enables the scheduler 118 to dispatch tasks from independent fibers 126 in the ready queue 130 without waiting for the dispatched tasks of the sleeping fibers 126 to be executed. Furthermore, the described techniques enable faster detection of task completion than conventional techniques because solely the fiber(s) 126 in the sleep queue 132 are evaluated for task completion. For at least these reasons, the described techniques decrease task scheduling and synchronization overhead, and thereby increase in-parallel execution of tasks in the task graph 112 through improved utilization of the processing element array 110.

Figure 2:
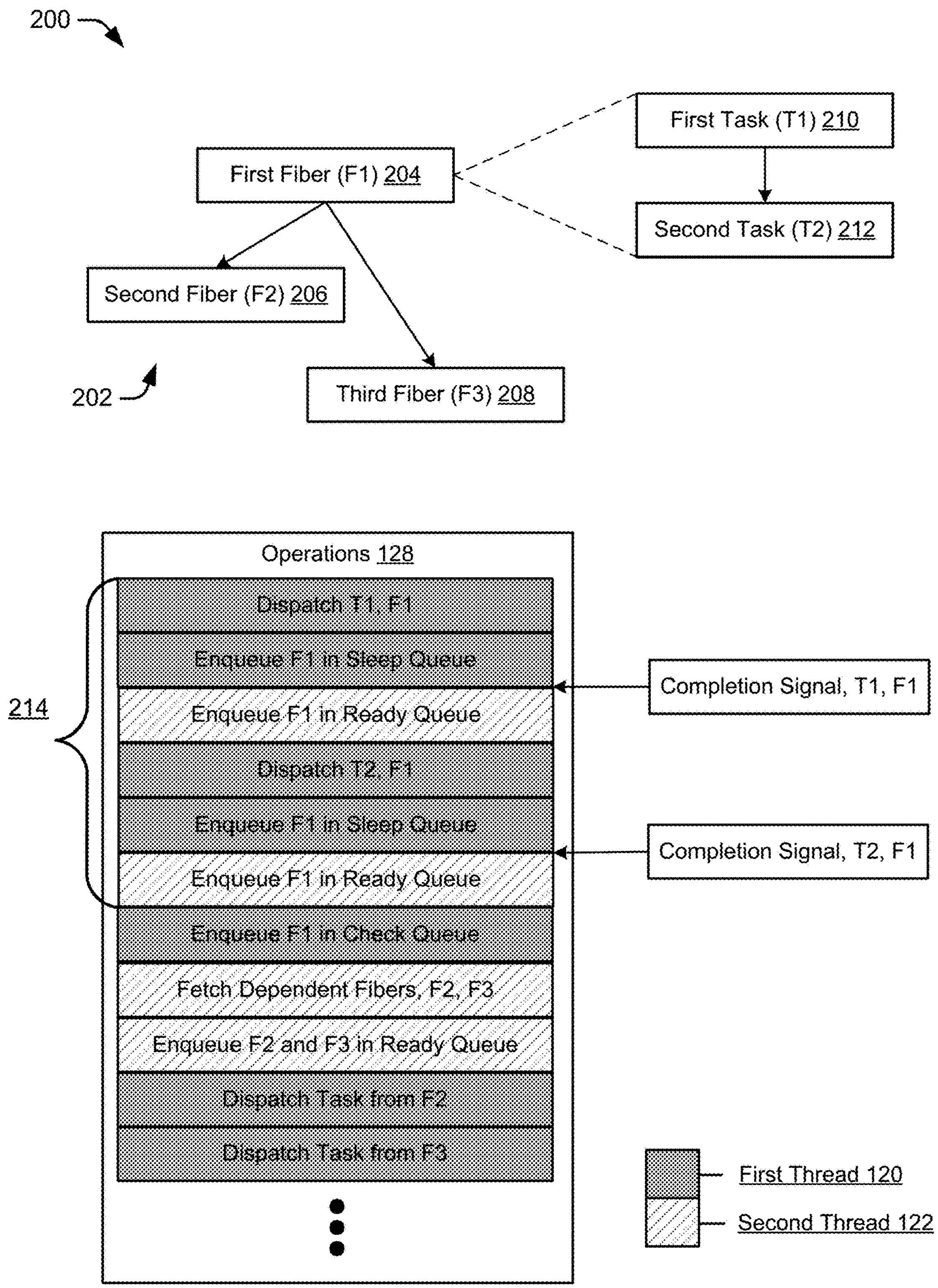
FIG. 2 depicts a non-limiting example in which a scheduler of a command processor manages a ready queue, a sleep queue, and a check queue.

FIG. 2 depicts a non-limiting example 200 in which a scheduler of a command processor manages a ready queue, a sleep queue, and a check queue. As shown, the example 200 includes operations 128 for processing fibers of a fiber graph 202 using the ready queue 130, the sleep queue 132, and the check queue 134. The fiber graph 202 includes a first fiber 204 (e.g., denoted as "F1"), a second fiber 206 (e.g., denoted as "F2"), and a third fiber 208, e.g., denoted as "F3." Further, the second fiber 206 and the third fiber 208 are dependent on the first fiber 204. The first fiber 204 includes a first task 210 (e.g., denoted as "T1") and a second task 212 (e.g., denoted as "T2"), and the second task 212 is dependent on the first task 210. Moreover, the operations 128 that are filled with the solid color are performed by the first thread 120, while the operations 128 that are filled with the striped pattern are performed by the second thread 122.

Before the operations 128 commence, one or more pre-processing steps are initially performed by the command processor 116. During the one or more pre-processing steps, the command processor 116 invokes a scheduler constructor which creates an instance of the scheduler 118 for an application, allocates resources (e.g., memory resources) to the instance of the scheduler 118, and initializes the queues 130, 132, 134. As part of this, the root node of the fiber graph 202 (e.g., the first fiber 204) is enqueued in the ready queue 130 because the first task 210 is independent of other tasks in the fiber graph 202. Upon encountering the first fiber 204 at the head of the ready queue 130, the first thread 120 dispatch the first task 210. To do so, the first thread 120 looks up the first fiber 204 in the memory 114 using the pointer to the first fiber 204 present in the ready queue 130. Based on the lookup, the first thread 120 identifies the first task 210 that is ready for dispatch, and dispatches the first task 210.

As part of dispatching a task to the processing element array 110, the first thread 120 selects an appropriate processing element of the array 110 to which the task is to be dispatched. In one or more implementations, the first thread 120 selects the appropriate processing element in accordance with a load balancing policy. Broadly, the load balancing policy dictates that balanced workloads are dispatched to each processing element of the array 110. For instance, the load balancing policy that equal (or substantially equal) numbers of tasks are dispatched to each processing element of the array 110. In at least one example, the load balancing policy is a round robin policy in which a number (n) of tasks are repeatedly dispatched in order to each processing element in the array 110, e.g., n tasks are dispatched to a first processing element, then n tasks are dispatched to a second processing element, and so on.

Additionally or alternatively, the first thread 120 selects the appropriate processing element in accordance with a locality policy. The locality policy dictates that the tasks of a fiber 126 are dispatched to a same processing element in the array 110. By way of example, the locality policy indicates to dispatch each task of the first fiber 204 to a first processing element, dispatch each task of the second fiber 206 to a second processing element, and dispatch each task of the third fiber 208 to a third processing element. In implementations in which the fibers 126 of the fiber graph 124 each include just one task, the locality policy indicates to dispatch a child task to a same processing element to which a parent task was dispatched.

Notably, the load balancing policy enables increased utilization of individual processing elements in the array 110, and in turn, increased in-parallel execution of tasks in the fiber graph 124, as compared to the locality policy. In contrast, the locality policy enables reduced data transfer overhead since tasks are transferred between individual processing elements less frequently than the load balancing policy.

In one or more implementations, the first thread 120 is configured to selectively implement the load balancing policy or the locality policy based on the compute-to-memory ratio of a workload. For example, the command processor 116 tracks the compute-to-memory ratio of workloads as the workloads are processed. If the compute-to-memory ratio falls below a threshold, then the command processor 116 instructs the first thread 120 to implement the load balancing policy. If, however, the compute-to-memory ratio meets or exceeds the threshold, then the command processor 116 instructs the first thread 120 to implement the locality policy.

This is because, as the compute-to-memory ratio decreases, the task scheduling and synchronization overhead increases. Thus, when the compute-to-memory ratio is relatively low, maximizing utilization of the processing element array 110 becomes a primary objective of the scheduler 118 in order to prevent hindering the parallelism enabled by the accelerator device 104. In contrast, when the compute-to-memory ratio is relatively high, maximizing utilization of the processing element array 110 becomes a secondary objective, and it is more beneficial for overall computer performance to reduce data transfer between the processing elements of the processing element array 110.

After the first task 210 is dispatched, the first thread 120 moves the first fiber 204 from the ready queue 130 to the sleep queue 132. This is because (1) the first fiber 204 no longer includes a ready task, and (2) the first fiber 204 includes at least one sleeping task, e.g., the first task 210. Upon encountering the first fiber 204 at the head of the sleep queue 132, the second thread 122 monitors for the completion signals 138 of the first task 210. Once the completion signal 138 for the first task 210 is received, the second thread 122 "wakes up" the first fiber 204 by moving the first fiber

204 from the sleep queue 132 to the ready queue 130 because there are no remaining sleeping tasks in the first fiber 126.

It should be noted that "woken up" fibers 126 are pushed from the sleep queue 132 back to the ready queue 130 (rather than to the check queue 134) to support fibers 126 that include multiple tasks. Indeed, a fiber 126 is not immediately movable directly to the check queue 134 upon receipt of the completion signals 138 for the sleeping tasks in the fiber 126. This is because, even after the completion signals 138 for the sleeping tasks in the fiber 126 are received, the fiber 126 potentially includes remaining unexecuted tasks. Given this, the ready queue 130 includes both ready fibers 126 and complete fibers 126 in various scenarios. Accordingly, when a fiber 126 is encountered at the head of the ready queue 130, the first thread 120 dispatches a task from the fiber 126 if the fiber 126 includes at least one ready task, or the first thread 120 moves the fiber 126 to the check queue 134 if the fiber 126 is complete, as further discussed below.

Upon encountering the first fiber 204 at the head of the ready queue 130, the first thread 120 dispatches the second task 212 because the second task 212 has a resolved dependency on the first task 210. To do so, the first thread 120 looks up the first fiber 204 in the memory 114 using the pointer to the first fiber 204 present in the ready queue 130. Based on the lookup, the first thread 120 identifies the second task 212 that is ready for dispatch, and dispatches the second task 212.

In response to dispatching the second task 212, the first thread 120 moves the first fiber 204 from the ready queue 130 back to the sleep queue 132. This is because (1) the first fiber 204 no longer includes a ready task, and (2) the first fiber 204 includes at least one sleeping task, e.g., the second task 212. Upon encountering the first fiber 204 at the head of the sleep queue 132, the second thread 122 monitors for the completion signal 138 of the second task 212. Once the completion signal 138 is received, the second thread 122 moves the first fiber 204 from the sleep queue 132 back to the ready queue 130.

Upon encountering the first fiber 204 at the head of the ready queue 130, the first thread 120 moves the first fiber 204 from the ready queue 130 to the check queue 134 because the first fiber 204 has completed, e.g., each task in the first fiber 204 has been executed. Further, the second thread 122 fetches the dependent fibers 206, 208 from the memory 114 in response to encountering the first fiber 204 at the head of the check queue 134. To do so, the second thread 122 looks up the first fiber 204 in the memory 114, which includes pointers to the second fiber 206 and the third fiber 208 that depend on the first fiber 204. Using the pointers, the second thread 122 decrements the barriers associated with the fibers 206, 208 in the barrier table 136. Since the fibers 206, 208 are solely dependent on the first fiber 204, the barriers associated with the fibers 206, 208 are decremented to zero. Given this, the second thread 122 enqueues the second fiber 206 and the third fiber 208 in the ready queue 130.

Once the fibers 206, 208 are encountered in the ready queue 130, the first thread 120 dispatches ready tasks from the fibers 206, 208 based on the ready tasks having a resolved dependency on one or more tasks in the first fiber 204. The second fiber 206 and the third fiber 208 are similarly processed in accordance with the techniques described herein.

Although the depicted example 200 is described with respect to just three fibers 126, it is to be appreciated that the scheduler 118 concurrently manages a plurality of independent fibers 126, e.g., fibers 126 of different fiber graphs 124 and/or multiple independent fibers 126 of a same fiber graph 124. In various scenarios, therefore, multiple ready fibers 126 are enqueued in the ready queue 130 at a given point in time, and the multiple ready fibers 126 each include at least one task that is ready for dispatch. In one or more implementations, the first thread 120 dispatches tasks from the multiple ready fibers 126 based on a priority assigned to the multiple ready fibers 126, e.g., by the compiler 108. For instance, tasks are dispatched from fibers 126 having a higher relative priority among the multiple ready fibers 126 before fibers 126 having a lower relative priority among the multiple ready fibers 126. In at least one example, fibers 126 that occur on the critical path are assigned a higher relative priority than fibers 126 that occur outside the critical path. Notably, the critical path of a fiber graph 124 is the longest chain of dependent tasks in the fiber graph 124, such that delaying a task on the critical path delays completion of the fiber graph 124. By dispatching tasks that occur on the critical path first, the described techniques ensure that execution of the fiber graph 124, as a whole, is not delayed.

It should be noted that, in certain scenarios, dispatching the tasks based on the priority assigned to the tasks results in the tasks being dispatched out of order in relation to the queue order of the ready queue 130. In an example, the first thread 120 dispatches a task from a later-enqueued high priority fiber 126 before a task from an earlier-enqueued low priority fiber 126. In these scenarios, FIFO ordering of the ready queue 130 is still preserved. This is because, although the tasks are dispatched out of queue order, the fibers 126 are popped from the ready queue 130 (e.g., and moved to the sleep queue 132 or the check queue 134) in queue order. Continuing with the previous example, the earlier-enqueued fiber 126 is popped from the ready queue 130 before the later-enqueued fiber 126 despite the task of the later-enqueued fiber 126 being dispatched first.

Moreover, in various scenarios, multiple sleeping fibers 126 are enqueued in the sleep queue 132 at a given point in time. In such scenarios, the second thread 122 processes the multiple sleeping fibers 126 in accordance with a strict FIFO ordering policy or a search-based policy. In accordance with the strict FIFO ordering policy, the second thread 122 processes completion signals 138 associated with fibers 126 enqueued in the sleep queue 132 in an order by which the fibers were enqueued in the sleep queue 132. Consider an example in which a first fiber 126 is enqueued ahead of a second fiber 126 in the sleep queue 132. In accordance with the strict FIFO ordering policy in this example, the second thread 122 waits until the completion signals 138 of the sleeping tasks in the first fiber 126 are received before processing the completion signals 138 of the sleeping tasks in the second fiber 126.

In accordance with the search-based policy, the second thread 122 processes completion signals 138 for fibers 126 enqueued in the sleep queue 132 out of queue order in certain scenarios. In this policy, the second thread 122 identifies, responsive to a completion signal 138 being received, a fiber 126 in the sleep queue 132 that contains a task corresponding to the received completion signal 138. Notably, the fiber 126 is identified regardless of whether the fiber 126 is at the head of the sleep queue 132. In response to identifying the fiber 126, the second thread 122 invalidates the fiber 126 and pushes the fiber 126 to the tail of the sleep queue 132. This is because, in various scenarios, the identified fiber 126 is not at the head of the sleep queue 132. Thus, in order to maintain FIFO ordering, the fiber 126 is not immediately removable from the sleep queue 132. When dispatched tasks of other fibers 126 in the sleep queue 132 are executed, the other fibers 126 are similarly invalidated and pushed to the tail of the sleep queue 132.

As a result, a series of invalidated fibers 126 are enqueued in the sleep queue 132 in completion order, e.g., an order in which the dispatched tasks of the fibers 126 in the sleep queue 132 are executed. Upon encountering a fiber 126 that has been invalidated at the head of the sleep queue 132, the second thread 122 moves the fiber 126 to the ready queue 130. Accordingly, the search-based policy enables the second thread 122 to push the fibers 126 from the sleep queue 132 to the ready queue 130 in completion order. Further, the completion order is potentially out-of-order with respect to (1) the order in which tasks were dispatched from the fibers 126 and (2) the order in which the fibers 126 were originally enqueued in the sleep queue 132.

As previously noted, the second thread 122 manages both the sleep queue 132 and the check queue 134. To do so, the second thread 122 alternates between processing sleeping fibers 126 in the sleep queue 132, and processing complete fibers 126 in the check queue 134. As part of processing the sleeping fibers 126 in the sleep queue 132, the second thread 122 checks if the sleep queue 132 includes a fiber 126. If the sleep queue 132 is empty, then the second thread 122 alternates to processing the complete fibers 126 in the check queue 134. If, however, the sleep queue 132 includes entries, then the sleeping fibers 126 in the sleep queue 132 are processed differently depending on whether the strict FIFO ordering policy or the search-based policy is implemented. In accordance the strict FIFO ordering policy, the second thread 122 alternates to processing the complete fibers 126 in the check queue 134 responsive to (1) encountering a fiber 126 at the head of the sleep queue 132 having sleeping tasks for which the completion signals 138 have not been received, or (2) draining the fibers 126 in the sleep queue 132. In the search-based policy, the second thread 122 alternates to processing the completed fibers 126 in the check queue responsive to draining the fibers 126 in the sleep queue 132.

As part of processing the completed fibers 126 in the check queue 134, the second thread 122 checks if the check queue 134 includes a fiber 126. If the check queue 134 is empty, the second thread 122 alternates back to processing the sleeping fibers 126 in the sleep queue 132. If, however, there are completed fibers 126 in the check queue 134, the second thread 122 processes the completed fibers 126 in queue order until the check queue is drained. Then, the second thread 122 alternates back to processing the sleeping fibers 126 in the sleep queue 132.

As previously mentioned, the first thread 120 manages the ready queue 130, while the second thread 122 manages the sleep queue 132 and the check queue 134. By partitioning the queues 130, 132, 134 among the threads 120, 122 in this manner, each of the queues 130, 132 are single-producer, single-consumer queues. Indeed, fibers 126 are enqueued in the sleep queue 132 and the check queue 134 by the first thread 120, while fibers are removed from the sleep queue 132 and the check queue 134 by the second thread 122. Similarly, fibers 126 are enqueued in the ready queue 130 by the second thread 122, while fibers 126 are removed from the ready queue 130 by the first thread 120. Given this, each of the queues 130, 132, 134 are implementable lock-free, and as such, the described techniques benefit from improved computer performance over techniques that implement lock-based queues by avoiding overhead associated with acquiring, holding, and releasing locks.

In an alternative implementation, sleeping fibers 126 are maintained in a sleep pool, rather than the sleep queue 132. For example, the first thread 120 pushes a fiber 126 from the ready queue 130 to the sleep pool responsive to dispatching a ready task from the fiber 126. Once the dispatched task is executed, a wakeup command is enqueued in the sleep queue 132 by the processing element that executes the task. The wakeup command corresponds to or includes an identifier of the dispatched task in the fiber 126 that has now been executed. In response to encountering the wakeup command at the head of the sleep queue 132, the second thread 122 looks up the fiber 126 identified by the wakeup command in the sleep pool. Furthermore, the second thread 122 retrieves the fiber 126 from the sleep pool, and "wakes up" the fiber 126 by enqueueing the fiber 126 in the ready queue 130 based on the dispatched task of the fiber 126 having been executed.

In this alternative implementation, wakeup commands are enqueued in the sleep queue 132 in completion order, and as such, the second thread 122 moves fibers 126 from the sleep pool to the ready queue 130 in completion order. Notably, the completion order is potentially out-of-order with respect to (1) the order in which tasks were dispatched from the fibers 126 and (2) the order in which the fibers 126 were placed in the sleep pool.

Figure 3:
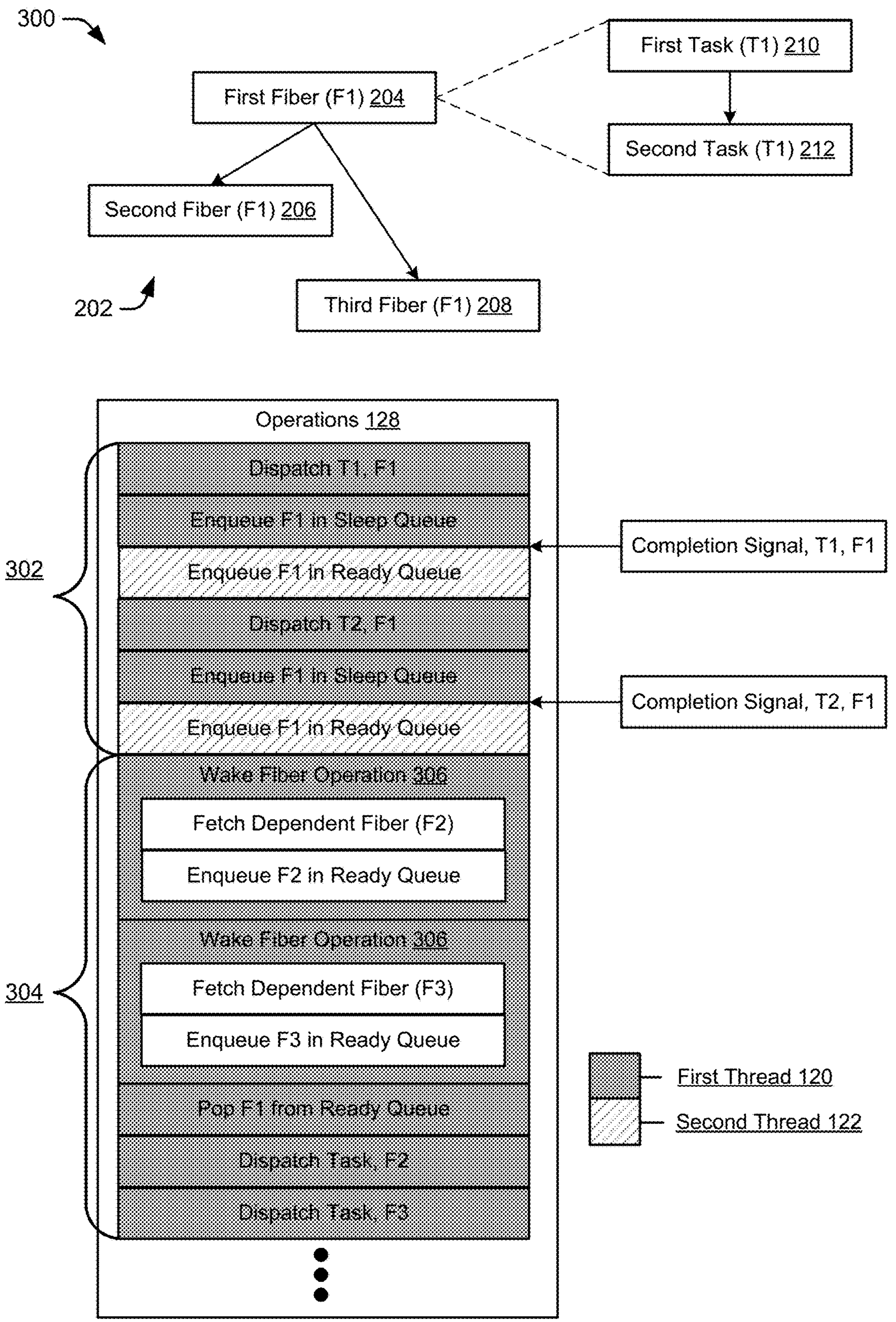
FIG. 3 depicts a non-limiting example in which a scheduler of a command processor manages a ready queue and a sleep queue.

FIG. 3 depicts a non-limiting example 300 in which a scheduler of a command processor manages a ready queue and a sleep queue. As shown, the example 300 includes operations 128 for processing fibers of the fiber graph 202 using the ready queue 130 and the sleep queue 132, i.e., without using the check queue 134. Moreover, the operations 128 that are filled with the solid color are performed by the first thread 120, while the operations 128 that are filled with the striped pattern are performed by the second thread 122. Here, a first subset 302 of operations 128 are identical to a subset 214 of operations 128 in FIG. 2, including the aforementioned pre-processing steps. Accordingly, the following discussion focuses on a second subset 304 of operations 128 that differ from the operations 128 of FIG. 2.

To facilitate the fetching of dependent fibers 126 from the memory 114 when dependencies are resolved, wake fiber operations 306 are placed (e.g., by the compiler 108) within a fiber's stream of operations 128. Generally, a wake fiber operation 306 within a parent fiber's 126 stream of operations 128 instructs the first thread 120 to enqueue a child fiber 126 in the ready queue 130 based on the child fiber's 126 dependencies being resolved via completion of the parent fiber 126. To do so, a wake fiber operation 306 in a parent fiber's 126 stream of operations 128 includes a pointer to a child fiber 126 that depends from the parent fiber 126. Moreover, a wake fiber operation 306 in a parent fiber's stream of operations 128 is placed immediately subsequent to an operation 128 to enqueue the parent fiber 126 in the ready queue 130 after a final task of the parent fiber 126 has been executed. Furthermore, a parent fiber's 126 stream of operations 128 includes a wake fiber operation 306 for each child fiber 126 that depends from the parent fiber 126.

Here, the first fiber 204 is enqueued in the ready queue 130 after both the first task 210 and the second task 212 of the first fiber 204 have been executed by the processing element array 110. Next, the first fiber's 204 stream of operations includes two wake fiber operations 306 because there are two fibers 206, 208 that depend from the first fiber 204-*a* first wake fiber operation 306 identifying the second fiber 206 and a second wake fiber operation 306 identifying the third fiber 208. Upon encountering the first fiber 204 at the head of the ready queue 130, the first thread 120 processes the first wake fiber operation 306. To do so, the first thread 120 fetches the second fiber 208 from the memory 114 using the pointer to the second fiber 206 included in the first wake fiber operation 306, and enqueues the second fiber 206 in the ready queue 130. Upon encountering the second wake fiber operation 306 at the head of the ready queue 130, the first thread 120 processes the second wake fiber operation 306. To do so, the first thread 120 fetches the third fiber 208 from the memory 114 using the pointer to the third fiber 208 included in the second wake fiber operation 306, and enqueues the third fiber in the ready queue 130.

After the third fiber 208 is enqueued in the ready queue 130, the ready queue 130 pops (e.g., removes) the first fiber 204 from the ready queue 130. Once the fibers 206, 208 are encountered in the ready queue 130, the first thread 120 dispatches ready tasks from the fibers 206, 208 based on the ready tasks having a resolved dependency on one or more tasks in the first fiber 204. The second fiber 206 and the third fiber 208 are similarly processed in accordance with the techniques described herein.

To support child fibers 126 that depend from multiple parent fibers 126, the first thread 120 leverages the barrier table 136. As part of processing a wake fiber operation 306 that points to a child fiber 126, for example, the first thread 120 decrements the barrier associated with the child fiber 126 in the barrier table 136. If the wake fiber operation 306 decrements the barrier of the child fiber 126 to a non-zero value, then the child fiber 126 is not enqueued in the ready queue 130. In contrast, if the wake fiber operation 306 decrements the barrier of the child fiber 126 to zero, then the first thread 120 enqueues the child fiber 126 in the ready queue 130.

In one or more implementations, an alternative approach for processing the fiber graph 124 without using the check queue 134 is feasible. In this alternative approach, the first thread 120 initially enqueues each fiber 126 of the fiber graph 124 in the sleep queue 132 when the fiber 126 is initially received for processing. When a completion signal 138 is received, the second thread 122 looks up the fiber 126 in the sleep queue 132 that contains the task associated with the completion signal 138. If the fiber 126 is complete after execution of the task, the second thread 122 evicts the fiber 126 from the sleep queue 132, and decrements the barriers of child fibers 126 in the barrier table 136 that depend from the fiber 126. Based on a barrier of a child fiber 126 being decremented to zero, the second thread 122 looks up the child fiber 126 in the sleep queue 132 and pushes the child fiber 126 to the ready queue 130. If, however, the fiber 126 containing the task associated with the received completion signal 138 is incomplete after execution of the task (e.g., the fiber 126 includes an unexecuted ready task), the second thread 122 moves the fiber 126 to the ready queue 130. In this alternative approach, fibers 126 are removed from the sleep queue 132 in a search-based non-FIFO manner.

By processing the fibers 126 of a fiber graph 124 without utilizing the check queue 134, the described techniques eliminate computational overhead associated with maintaining an additional queue. This overhead includes, for example, additional operations 128 to enqueue fibers 126 and/or tasks in the check queue 134, additional cross-thread data transfers to transfer fibers 126 from the ready queue 130 to the check queue 134, and the like.

FIG. 4 depicts a non-limiting example 400 in which a scheduler of a command processor manages a ready queue, a signal queue, and a check queue. As shown, the example 400 includes operations 128 for processing fibers of the fiber graph 202 using the ready queue 130, a signal queue, and the check queue 134. Here, the ready queue 130 is modified in the sense that sleeping fibers 126 are enqueued in the ready queue 130 rather than the sleep queue 132. Moreover, a signal queue is implemented in lieu of the sleep queue 132, and the signal queue solely includes completion signals 138 of executed tasks.

In order to determine whether fibers in the ready queue 130 are ready fibers or sleeping fibers, the first thread 120 leverages the barrier table 136. Accordingly, the fiber graph 202 in this example 400 includes a barrier 402 between the first task 210 and the second task 212, and the barrier 402 has a value of one in the barrier table 136, e.g., due to the second task's 212 dependency on the first task 210. Similarly, the fiber graph 202 includes a barrier 404 between the first fiber 204 and the second fiber 206, as well as a barrier 406 between the first fiber 204 and the third fiber 208. The barriers 404, 406 have a value of one in the barrier table 136, e.g., due to the fibers' 206, 208 dependency on the first fiber 204.

Initially, the one or more pre-processing steps are performed by the command processor 116 to create an instance of the scheduler 118 for an application, allocate resource to the instance of the scheduler 118, and initialize the ready queue 130, the signal queue, and the check queue 134. As part of this, the root node of the fiber graph 202 (e.g., the first fiber 204) is enqueued in the ready queue 130. Upon encountering the first fiber 204 at the head of the ready queue 130, the first thread 120 dispatches the first task 210 based on the first task 210 having no unresolved dependencies. After dispatching the first task 210, the first thread 120 encounters the barrier 402 at the head of the ready queue 130. In response, the first thread 120 checks the value of the barrier 402 in the barrier table 136. Since the first task 210 has not yet been executed, the value of the barrier 402 is still set to one. Accordingly, the first thread 120 pushes the first fiber 126 to the tail of the ready queue 130 based on the barrier 402 having the non-zero value, i.e., based on the first fiber 126 including at least one sleeping task.

In response to receiving the completion signal 138 for the first task 210, the second thread 122 enqueues the completion signal 138 in the signal queue. Upon encountering the completion signal for the first task 210 at the head of the signal queue, the second thread 122 decrements the barrier 402. This is because the barrier 402 represents the second task's 212 dependency on the first task 210, which is now resolved. Next, the first thread 120 encounters the barrier 402 at the head of the ready queue 130, and checks the value of the barrier 402 in the barrier table 136. Since the barrier 402 has a value of zero, the first thread 120 clears the barrier 402 and dispatches the second task 212.

After dispatching the second task 212, the first thread 120 encounters the barriers 404, 406 at the head of the ready queue 130 and checks the values of the barriers 404, 406 in the barrier table 136. Since all tasks in the first fiber 126 have not yet been executed, the barriers 404, 406 still have a value of one. Accordingly, the first thread 120 pushes the first fiber 126 to the tail of the ready queue 130 based on the barriers 404, 406 having the non-zero value, i.e., based on the first fiber 204 including at least one sleeping task.

In response to receiving the completion signal 138 for the second task 212, the second thread 122 enqueues the completion signal 138 in the signal queue. Upon encountering the completion signal 138 for the second task 212 at the head of the signal queue, the second thread 122 decrements the barriers 404, 406. Next, the first thread 120 again encounters the barriers 404, 406 at the head of the ready queue 130 and checks the values of the barriers 404, 406 in the barrier table 136. Since the values for the barriers 404, 406 have been decremented to zero, the first thread 120 clears the barriers 404, 406 and moves the first fiber 204 to the check queue 134. In other words, the first thread 120 moves the first fiber 126 to the check queue 134 based on all tasks in the first fiber 126 having been executed by the processing element array 110.

Upon encountering the first fiber 204 at the head of the check queue 134, the second thread 122 fetches the dependent fibers 206, 208 from the memory 114, and enqueues the dependent fibers 206, 208 in the ready queue 130 in accordance with the described techniques. Furthermore, tasks are dispatched from the dependent fibers 206, 208 when the dependent fibers 206, 208 reach the head of the ready queue 130 based on at least one task in each of the dependent fibers 206, 208 having a resolved dependency on the one or more tasks of the first fiber 204. The second fiber 206 and the third fiber 208 are similarly processed in accordance with the described techniques.

By processing the fibers 126 of a fiber graph 124 using the signal queue in lieu of the sleep queue 132, cross-thread communication of the fibers 126 (e.g., the pointers to the fibers 126) is reduced. Indeed, in implementations in which the sleep queue 132 is implemented, a fiber 126 is communicated from the first thread 120 to the second thread 122 when a task is dispatched from the fiber 126, and communicated back from the second thread 122 to the first thread 120 when a task is executed. In implementations in which the signal queue is implemented however, a fiber 126 remains in control of the first thread 120 until all tasks in the fiber 126 are executed. By reducing cross-thread communication, the described techniques improve data locality on the command processor 116.

Notably, examples are depicted and described herein in which the queues 130, 132, 134 are partitioned across the first thread 120 and second thread 122, e.g., the first thread 120 manages the ready queue 130, while the second thread 122 manages the sleep queue 132, the signal queue, and/or the check queue 134. However, it is to be appreciated that, in one or more implementations, each thread 120, 122 manages its own set of queues. By way of example, the first thread 120 manages a ready queue 130, a sleep queue 132, a signal queue, and/or a check queue 134, while the second thread 122 manages a different ready queue 130, a different sleep queue 132, a different signal queue, and/or a different check queue 134. In other words, the operations 128 of FIG. 2 are implementable by a single thread, the operations 128 of FIG. 3 are implementable by a single thread, and the operations 128 of FIG. 4 are implementable by a single thread. By implementing each interacting queue on a single thread, cross-thread communication is reduced, thereby improving data locality on the command processor 116.

It should be noted that, in certain scenarios, the scheduler 118 is configured to concurrently manage multiple fiber graphs 124. In one example, the scheduler 118 maintains a single set of queues (e.g., one ready queue 130, one sleep queue 132, one signal queue, and/or one check queue 134) for the multiple fiber graphs 124. In this example, fibers 126 from different fiber graphs 124 are simultaneously enqueued in the single set of queues. In another example, the scheduler 118 maintains a single set of queues (e.g., one ready queue 130, one sleep queue 132, one signal queue, and/or one check queue 134) for each fiber graph 124 that is being processed. In this example, fibers 126 from different respective fiber graphs 124 are maintained in different respective sets of queues.

Figure 5:
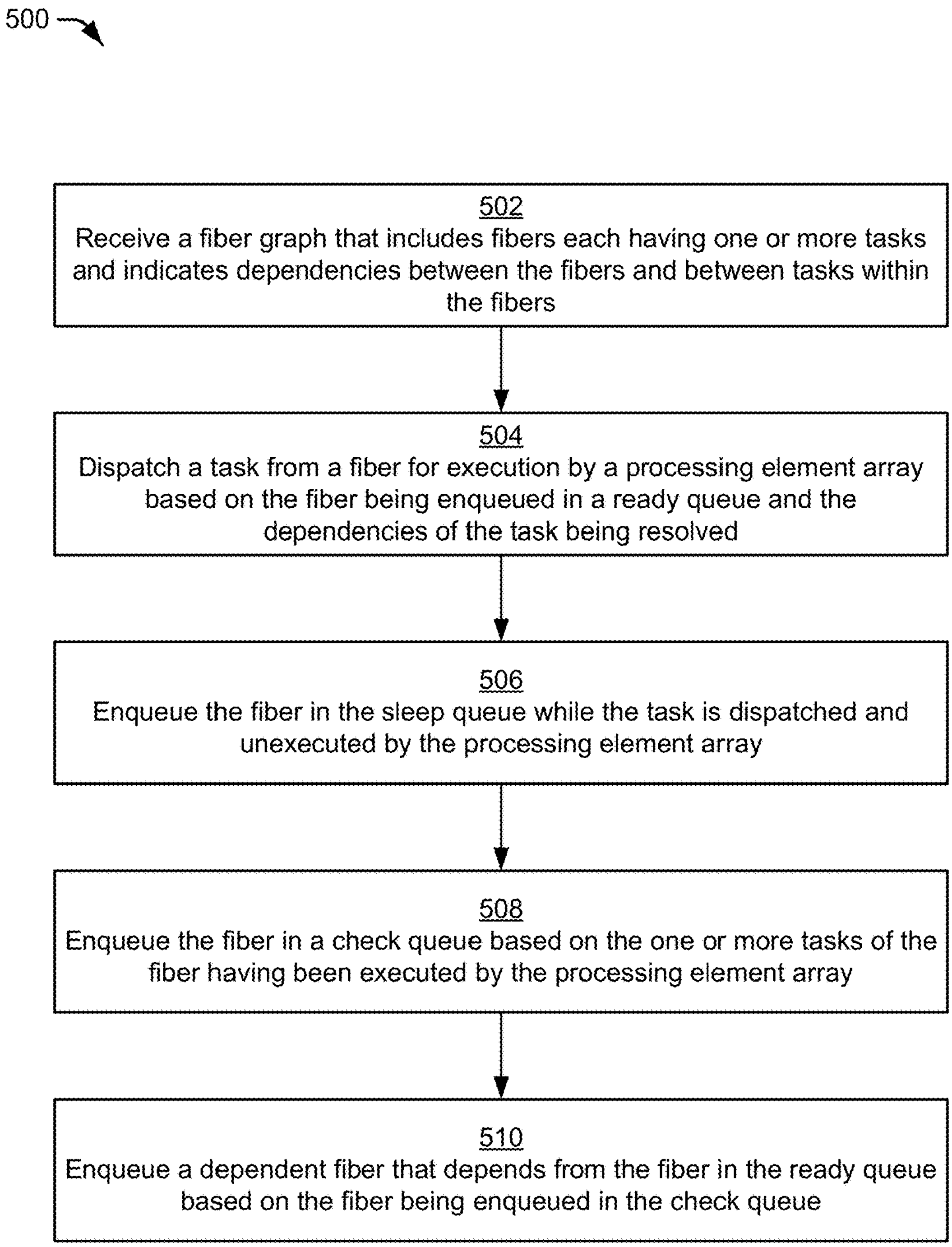
FIG. 5 depicts a procedure in an example implementation of queue management for task graphs.

FIG. 5 depicts a procedure 500 in an example implementation of queue management for task graphs. In the procedure 500, a fiber graph is received that includes fibers each having one or more tasks and indicates dependencies between the fibers and between tasks within the fibers (block 502). By way of example, the accelerator device 104 receives the fiber graph 124 that includes the fibers 126, the fiber level dependencies between the fibers 126, as well as the task level dependencies between individual tasks of a respective fiber 126. In addition, the fibers 126 each include operations 128 defined by the compiler 108 specifying movement of the fibers 126 between the queues 130, 132, 134, and functions to be performed based on the queue 130, 132, 134 in which the fibers 126 are enqueued.

A task is dispatched from a fiber for execution by a processing element array based on the fiber being enqueued in a ready queue and the dependencies of the task being resolved (block 504). By way of example, the second thread 122 enqueues a fiber 126 in the ready queue 130 based on the fiber 126 including a ready task, e.g., a task that is either independent or has its dependencies resolved. Moreover, the first thread 120 dispatches the ready task responsive to encountering the fiber 126 at the head of the ready queue 130.

The fiber is enqueued in the sleep queue while the task is dispatched and unexecuted by the processing element array (block 506). In response to dispatching the task, for instance, the first thread 120 moves the fiber to sleep queue 132. This is because (1) the fiber 126 no longer includes a ready task, and (2) the fiber includes at least one sleeping task, e.g., a task that has been dispatched but has not been executed by the processing element array 110.

The fiber is enqueued in a check queue based on the one or more tasks of the fiber having been executed by the processing element array (block 508). By way of example, the second thread 122 encounters the fiber 126 at the head of the sleep queue 132, and in response, the second thread 122 determines that a completion signal 138 for the dispatched task of the fiber 126 has been received. Given this, the second thread 122 "wakes up" the fiber 126 by moving the fiber 126 to the ready queue 130. Upon encountering the fiber 126 at the head of the ready queue 130, the first thread 120 determines whether the fiber 126 has any remaining ready tasks. If so, the first thread 120 dispatches the ready tasks for execution by the processing element array 110, and moves the fiber 126 to the sleep queue 132. Here, however, the first thread 120 determines that each task in the fiber 126 has been executed by the processing element array 110, and as such, the first thread 120 moves the fiber 126 to the check queue 134.

A dependent fiber that depends from the fiber is enqueued in the ready queue based on the fiber being enqueued in the check queue (block 510). By way of example, the second thread 122 encounters the fiber 126 at the head of the check queue 134. In response, the second thread 122 fetches a dependent fiber 126 that depends on the fiber 126 from the memory 114. To do so, the second thread 122 looks up the fiber 126 in the memory 114 using the pointer to the fiber 126 that is present in the check queue 134. Further, the fiber 126 stored in the memory 114 also includes a pointer to the dependent fiber 126. Using the pointer to the dependent fiber, the scheduler 118 enqueues the dependent fiber 126 in the ready queue 130 based on the fiber 126 having a resolved dependency on the one or more tasks of the fiber 126. Upon encountering the dependent fiber 126 at the head of the ready queue 130, the first thread 120 dispatches a task from the dependent fiber 126 based on the task having a resolved dependency on the one or more tasks of the fiber 126.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the host 102, the accelerator device 104, the compiler 108, the processing element array 110, the command processor 116, the scheduler 118, the first thread 120, and the second thread 122) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An accelerator device, comprising:

a processing element array;

a memory configured to store a fiber graph that includes fibers each having one or more tasks, the fiber graph indicating dependencies between the fibers and between the tasks within the fibers; and a command processor including a first thread that manages a ready queue and a second thread that manages a sleep queue and a check queue, the command processor configured to perform operations including:

dispatching a task from a fiber for execution by the processing element array based on the fiber being enqueued in the ready queue and the dependencies of the task being resolved;

enqueueing the fiber in the sleep queue while the task is dispatched and unexecuted by the processing element array;

enqueueing the fiber in the check queue based on the one or more tasks of the fiber having been executed by the processing element array; and enqueuing a dependent fiber that depends from the fiber in the ready queue based on the fiber being enqueued in the check queue.

2. The accelerator device of claim 1, the operations further including dispatching an additional task from the dependent fiber based on the dependent fiber being enqueued in the ready queue and the dependencies of the additional task being resolved.

3. The accelerator device of claim 1, wherein an additional fiber is enqueued ahead of the fiber in the ready queue and the dependencies of an additional task in the additional fiber are resolved, the task being dispatched before the additional task based on the fiber being assigned a higher priority than the additional fiber.

4. The accelerator device of claim 1, wherein enqueuing the fiber in the check queue includes:

moving the fiber from the sleep queue to the ready queue responsive to receiving a completion signal indicating that the task has been executed by the processing element array;

dispatching an additional task from the fiber based on the fiber being in the ready queue and the dependencies of the additional task being resolved;

moving the fiber from the ready queue to the sleep queue while the additional task is dispatched and unexecuted by the processing element array;

moving the fiber from the sleep queue to the ready queue responsive to receiving an additional completion signal indicating that the additional task has been executed by the processing element array; and moving the fiber from the ready queue to the check queue based on the one or more tasks of the fiber having been executed by the processing element array.

5. The accelerator device of claim 4, wherein an additional fiber is enqueued ahead of the fiber in the sleep queue, and moving the fiber to the ready queue includes waiting for a dispatched task of the additional fiber to be executed before processing the completion signal of the task.

6. The accelerator device of claim 4, wherein an additional fiber is enqueued ahead of the fiber in the sleep queue, and moving the fiber to the ready queue includes processing the completion signal of the task before a dispatched task of the additional fiber has been executed.

7. The accelerator device of claim 1, wherein enqueuing the dependent fiber in the ready queue includes:

retrieving the dependent fiber from the memory based on the dependent fiber being identified using the fiber graph; and enqueueing the dependent fiber in the ready queue based on the dependent fiber having a resolved dependency on the one or more tasks of the fiber.

8. The accelerator device of claim 1, wherein management of the ready queue by the first thread and management of the sleep queue and the check queue by the second thread causes the ready queue, the sleep queue, and the check queue to be single-producer, single-consumer queues.

9. The accelerator device of claim 1, wherein dispatching the task includes selecting, in accordance with a load balancing policy, a processing element of the processing element array to which the task is to be dispatched, the load balancing policy indicating to balance workloads dispatched to each processing element of the processing element array.

10. The accelerator device of claim 1, wherein dispatching the task includes selecting, in accordance with a locality policy, a processing element of the processing element array to which the task is to be dispatched, the locality policy indicating to dispatch the one or more tasks of each respective fiber to a same respective processing element of the processing element array.

11. The accelerator device of claim 1, wherein enqueuing the fiber in the sleep queue includes:

placing the fiber in a sleep pool while the task is dispatched and unexecuted by the processing element array; and enqueuing, by the processing element array and responsive to the task being executed, a wakeup command in the sleep queue that identifies the fiber.

12. The accelerator device of claim 11, wherein enqueuing the fiber in the check queue includes:

looking up the fiber in the sleep pool based on the wakeup command being enqueued in the sleep queue; and retrieving the fiber from the sleep pool.

13. The accelerator device of claim 1, wherein the ready queue, the sleep queue, and the check queue are first-in-first-out queues.

14. The accelerator device of claim 1, wherein the first thread manages the ready queue by moving fibers from the ready queue to the sleep queue and the check queue, and the second thread manages the ready queue and the sleep queue by moving fibers from the ready queue and the sleep queue to the ready queue.

15. A method, comprising:

receiving, by a command processor, a fiber including one or more tasks and dependencies between the one or more tasks, the command processor including a first thread that manages a ready queue and a second thread that manages a sleep queue;

dispatching, by the command processor, a task from the fiber for execution by a processing element array based on the fiber being enqueued in the ready queue and the dependencies of the task being resolved;

enqueueing, by the command processor, the fiber in the sleep queue while the task is dispatched and unexecuted by the processing element array;

enqueueing, by the command processor, the fiber in the ready queue based on receiving a completion signal indicating that the task has been executed by the processing element array; and enqueueing, by the command processor, a dependent fiber that depends from the fiber in the ready queue based on the fiber being enqueued in the ready queue and the one or more tasks of the fiber having been executed by the processing element array.

16. The method of claim 15, wherein the fiber includes a set of operations instructing the command processor to process the fiber, and the dependent fiber is enqueued in the ready queue based on a wake fiber operation in the set of operations that identifies the dependent fiber.

17. The method of claim 16, wherein the wake fiber operation is placed within the set of operations after an operation to enqueue the fiber in the ready queue based on a final task of the fiber having been executed by the processing element array.

18. A system, comprising:

an accelerator device that includes a command processor and a processing element array, the command processor including a first thread that manages a ready queue and a second thread that manages a check queue; and a host configured to compile operations for executing a fiber graph that includes fibers each having one or more tasks, the fiber graph indicating dependencies between the fibers and between the tasks within the fibers, the operations instructing the command processor to:

dispatch a task from a fiber for execution by the processing element array based on the fiber being enqueued in the ready queue and the dependencies of the task being resolved;

push the fiber to a tail of the ready queue based on the task being dispatched and unexecuted by the processing element array;

enqueue the fiber in the check queue based on the fiber being enqueued in the ready queue and the one or more tasks of the fiber having been executed by the processing element array; and enqueue a dependent fiber that depends from the fiber in the ready queue based on the fiber being enqueued in the check queue.

19. The system of claim 18, wherein the fiber includes a barrier representing the dependencies of the dependent fiber, and the command processor maintains a barrier table that includes a value representing a number of unresolved dependencies associated with the barrier.

20. The system of claim 19, wherein to enqueue the fiber in the check queue, the operations instruct the command processor to:

receive a completion signal indicating that the task has been executed by the processing element array;

enqueue the completion signal in a signal queue;

decrement the value associated with the barrier in the barrier table based on the completion signal being in the signal queue; and enqueue the fiber in the check queue based on the value associated with the barrier being decremented to zero.

* * * * *